United States Patent [19]

Harada et al.

[11] Patent Number: 5,736,239

[45] Date of Patent: Apr. 7, 1998

[54] COATING LAYER AND FILM HAVING FLIP-FLOP PROPERTIES

[75] Inventors: Hidefumi Harada; Shigeru Nagaoka, both of Yamaguchi-ken, Japan

[73] Assignee: Titan Kogyo Kabushiki Kaisha, Yamaguchi-ken, Japan

[21] Appl. No.: 576,844

[22] Filed: Dec. 21, 1995

Related U.S. Application Data

[63] Continuation of Ser. No. 255,896, Jun. 7, 1994, abandoned, which is a continuation of Ser. No. 5,065, Jan. 15, 1993, abandoned.

[51] Int. Cl.$^6$ ............................................. B32B 5/16
[52] U.S. Cl. .................... 428/329; 428/469; 428/697; 428/699; 428/701; 428/702
[58] Field of Search .................... 428/688, 689, 428/697, 702, 216, 329, 701, 699, 469; 106/415, 456, 459

[56] References Cited

U.S. PATENT DOCUMENTS

| | | | |
|---|---|---|---|
| 4,234,348 | 11/1980 | Brunn | 106/459 |
| 4,373,963 | 2/1983 | Uenishi et al. | 106/304 |
| 4,826,537 | 5/1989 | Ostertag | 106/459 |
| 5,017,638 | 5/1991 | Handa | 524/449 |

FOREIGN PATENT DOCUMENTS

| | | |
|---|---|---|
| 0068311 | 1/1983 | European Pat. Off. . |
| 0068311 | 2/1985 | European Pat. Off. . |
| 4202477 | 7/1992 | Japan . |

*Primary Examiner*—Timothy Speer
*Attorney, Agent, or Firm*—Roylance, Abrams, Berdo & Goodman, L.L.P.

[57] ABSTRACT

The present invention provides a novel coating layer or a film having a flip-flop property, comprising a mica-like red iron oxide of less than 0.25 μm in thickness containing aluminum in solid solution and a solid resin component, with the proportion of said iron oxide being 0.1–20 parts by weight per 100 parts by weight of the solid resin component.

2 Claims, 8 Drawing Sheets

THIRD LAYER
(CLEAR LAYER)

SECOND LAYER
(AI - MIO)

FIRST LAYER
(COLOURED LAYER)

THIRD LAYER
(CLEAR LAYER)

SECOND LAYER
(Al-MIO)

FIRST LAYER
(COLOURED LAYER)

ALUMINUM PLATE

COATING LAYER AND FILM HAVING FLIP-FLOP PROPERTIES

This is a continuation of application Ser. No. 08/255,896 filed Jun. 7, 1994 now abandoned which is a continuation of application Ser. No. 08/005,065 filed Jan. 15, 1993 now abandoned.

BACKGROUND OF THE INVENTION

This invention relates to a coating layer and a film having an excellent flip-flop property.

Recently, technical progress in the automobile industry has been remarkable, and all advanced modern technology has been put to use to make the latest and best hi-tech products. As a result, technical differences between many companies no longer exist, automobile concept and design having become the main areas where differences might occur. Further, with the trend of users requiring high class and high quality, the requirements for paint used on automobiles have become broader. Namely, these requirements are related not only to functional needs, such as durability in all environments (mainly meaning weatherproof), but also to new designs possessing a high level of sense quality, such as high quality external appearance, a sense of good material, and superiority to other products.

In view of the above, paints having new design characteristics, such as metallic paint using a lustrous aluminum and pearl lustrous paint using pearl mica have been put into actual use. Further, as a material which possesses a sense quality completely different from metallic or mica colors in the prior art, namely, having a bright three-dimensional brilliancy as if there are diamonds encased in the coating layer, a micaceous iron oxide (MIO) has been noted and put into application. This means that where a MIO is used as a metallic pigment, approximately more than 90% by weight of which has a lengthwise size of less than 30 μm, and approximately more than 40% by weight of which has a lengthwise size of 5–15 μm, and whose thickness is $1/10$–$1/20$ of the above lengthwise size, the flip-flop property almost disappears, thereby obtaining a coating layer possessing a bright brilliancy visible from every direction (see Japanese Patent Public Disclosure No. H1-254279).

In the above patent application, there is a disclosure about a painting method (as a finishing treatment) using a paint containing as metallic pigment a flaky iron oxide having a special shape. The object of the said invention is to reduce the flip-flop property of a metallic paint containing a scale-like flaky aluminum powder or the like. The iron oxide particles used in the above invention are opaque substances, and their flip-flop properties are avoided by reflecting almost all the light reaching these particles. Also related in the application is a case where a pearl lustrous pigment capable of passing light was incorporated. But in this case, the object was to obtain an interference color coming from the pearl lustrous pigment, and the flip-flop property was not desirable, so they tried to prevent the flip-flop property from occurring.

SUMMARY OF THE INVENTION

As has been related above, the lustrous pigments in the prior art do not possess any flip-flop property, or although they possess the flip-flop property, only the brightness or color undergoes a change.

In order to solve the aforesaid problems, the inventors of the present invention have conducted diligent research and finally found that the flip-flop property can be achieved by using a mica-like red iron oxide of a special shape containing aluminum in solid solution, thereby accomplishing this invention.

DETAILED DESCRIPTION OF THE INVENTION

According to the present invention, there is provided a coating layer possessing a flip-flop property, comprising a mica-like red iron oxide of less than 0.25 μm in thickness containing aluminum in solid solution and a solid vehicle component, with the proportion of said iron oxide being 0.1–20 parts by weight per 100 parts by weight of the solid vehicle. Also provided in this invention is a film possessing a flip-flop property, comprising the aforementioned mica-like red iron oxide containing aluminum in solid solution and a solid resin component, with the proportion of said iron oxide being 0.1–20 parts by weight per 100 parts by weight of the solid resin component.

The mica-like red iron oxide containing aluminum in solid solution which can be effectively used in the present invention is less than 0.25 μm in average thickness. If thickness exceeds this value, it will not be possible to obtain a flip-flop property whose brightness and color change, and the thus obtained coating layer lacks aesthetic feeling. Further, it is preferable to make the average diameter of the flaky direction over 5 microns, for if the average diameter is too small, the gloss will become weak and the flip-flop property will decrease.

The particles of mica-like red iron oxide of less than 0.25 μm in thickness containing aluminum in solid solution can be typically prepared according to the following method.

Namely, the mica-like red iron oxide containing aluminum in solid solution which can be used in the present invention can be prepared by applying a hydrothermal treatment to an iron oxyhydroxide or ferric colloidal precipitates in an aqueous aluminate solution. More specifically, for example, after α-iron oxyhydroxide (α-FeOOH) is dispersed in an aqueous solution of sodium aluminate, it is then subjected to a hydrothermal treatment at a temperature higher than 250° C. in an autoclave. The α-iron oxyhydroxide is immediately decomposed according to the formula of 2 α-FeOOH→α-$Fe_2O_3$+$H_2O$, and thus MIO (α-$Fe_2O_3$) is crystallized out. By this time aluminum ions from the solution enter into the crystal lattice and the mica-like red iron oxide containing aluminum in solid solution (α-$Fe_{2-x}Al_xO_3$) is thus formed.

The aqueous aluminate solution used as a mother liquid for the hydrothermal treatment in the aforesaid method is usually prepared by dissolving aluminate in water or aqueous alkaline solution, but can also be prepared from other aluminum compounds. Specifically, (1) in the case where aluminum compounds such as aluminum chloride, aluminum sulfate, aluminum nitrate or the like, whose aqueous solutions exhibit acidic natures, are to be used, they may be dissolved first in water and then used after alkali is added until the pH value of the aqueous solution becomes greater than 10. Namely, in an aqueous solution having a pH value greater than 10, aluminum is considered to be present as aluminate ions ("Qualitative Analytical Chemistry II" by G. Chariot, translated by Kozo Sekine and Genji Tanaka, published by Kyoritsu Shuppan K.K. in 1974), hence, an aqueous solution of aluminate can be prepared by the above operation. (2) If using metallic aluminum, aluminum trioxide and the like, these are dissolved in strong acid or strong alkali. They undergo the same procedures as shown in above (1) if dissolved in strong acid, or used as they are if dissolved in strong alkali. In each case, the solution is adjusted to an appropriate concentration.

The concentration of $Al_2O_3$ in the aqueous aluminate solution is 5–150 g/l, preferably 10–100 g/l. Namely, it is difficult to obtain a product with great a flip-flop property when the concentration is below 5 g/l; on the other hand, it is not practical to use the solution at a concentration of above 150 g/l, since it will become difficult to obtain a pigment with an excellent flip-flop property.

Further, the relative ratio between the $Al_2O_3$ concentration and the alkali concentration in the aqueous aluminate solution is also important. It is not desirable to use an excessively high alkali concentration relative to the $Al_1O_3$ concentration, since the solid solution ratio of aluminum in the MIO crystal will decrease and the properties of the resultant product will come close to those of MIO. On the other hand, if the alkali concentration is too low relative to the $Al_2O_3$ concentration, the storage stability of the solution is worsened. In the case where sodium aluminate is used as the aluminate, a suitable concentration ratio of NaOH(g/l) relative to $Al_2O_3$ (g/l) is between about 1.5–1.8 (NaOH/$Al_2O_3$).

Moreover, the concentration of the slurry in the hydrothermal treatment, where iron oxyhydroxide is used as the iron starting material, may vary depending on the kind of iron oxyhydroxide and the size of the particles. Thus, although the treatment is possible for slurry at a concentration as high as 500 g/l, depending on the conditions, the concentration usually lies in a range below 200 g/l, and a range below 100 g/l is particularly preferred in order to obtain a large resultant product with narrow grain size distribution.

Other factors that influence the grain size and thickness of the resultant product include the heating rate and the conditions of stirring during the hydrothermal treatment. Among them, the heating rate is especially related to the thickness of the resultant mica-like particles. Namely, it is necessary to keep the heating rate high in order to obtain a resultant product with reduced thickness. Especially, it is desirable to keep the heating rate as high as 50° C./hour for the range above 250° C. in order to obtain a mica-like red iron oxide containing aluminum in solid solution having an excellent flip-flop property.

As the vehicle component of a paint, since it is used to disperse the particles of the aforementioned iron oxide to form a coating layer, it is possible to use a well-known resin. Specifically, it is preferable to use a thermosetting resin which is obtained by incorporating (cross-linking agents such as amino resin, isocyanate resin, blocked isocyanate resin, etc.) into a matrix resin such as polyester resin or alkyd resin. It is also possible to use a resin which can form a coating layer at room temperature. Moreover, in the case where a film is to be formed, although all kinds of well-known thermoplastic resins and thermosetting resins can be used, it is particularly preferable to use resins having high transparency, such as vinyl chloride, polyamide, polycarbonate, polypropylene, polyethylene, ethylene copolymers such as ethylene-butene-1 copolymer and ethylene-vinyl acetate copolymer, and polymethyl methacrylate and polyvinylidene chloride.

The amount of mica-like red iron oxide containing aluminum in solid solution which is to be incorporated into the above-mentioned resins is preferably 0.1–20 parts by weight, more preferably 1–15 parts by weight. If the iron oxide amount to be incorporated is less than 0.1 parts by weight, it will be impossible to obtain a brilliant sense together with a flip-flop property. On the other hand, if the iron oxide to be incorporated is over 20 parts by weight, it will be meaningless as far as the purpose of providing a brilliant sense and flip-flop property is concerned, and not preferable economically. Although the coating layer and film according to the present invention contain as a main component the aforementioned mica-like iron oxide containing aluminum in solid solution, it is also possible to further incorporate a pearl lustrous pigment such as a well-known $TiO_2$-coated mica and a colored pearl mica or an organic pigment, in order to provide colorful variation. Particularly, if organic pigments having colors of blue, blue-green and green are used in combination with a pearl pigment and a mica-like iron oxide containing aluminum in solid solution, we can obtain a coating layer and a film having a remarkable flip-flop property.

The film or sheet of the present invention can be produced by, for example, the following process. Namely, the commonly used Bumbury mixer and 2 roll-mixing machines or extrusion machines are used to prepare a resin composition, then the said resin composition may be transformed into a film or a sheet by means of known methods such as common inflation processing, T die film or sheet processing, calendar processing, etc. At this time, it is permissible to incorporate well-known pearl lustrous pigments such as $TiO_2$ coated mica, and colored mica titanium, etc. or other various organic pigments and inorganic pigments.

Further, in order to obtain a laminated film or sheet with a transparent thermoplastic resin layer laminated on at least one surface of the resin layer comprising a mica-like red iron oxide containing aluminum in solid solution, a concrete process is that the mica-like red iron oxide containing aluminum in solid solution and the transparent thermoplastic resin are respectively extruded from two extruding machines with 2 layer-extruding die so as to be transformed into a 2 layer-film or sheet. Moreover, two extruding machines with 3 layer-extruding die may be used to laminate the transparent thermoplastic resin layer on both surfaces of a mediate layer comprising the mica-like red iron oxide containing aluminum in solid solution, thereby obtaining a 3 layer-film or sheet.

Numerical analysis of the color of the coating layer will be carried out later in the examples, but now it is necessary to complete the explanation of the analytical method and each variable.

Figure 1:
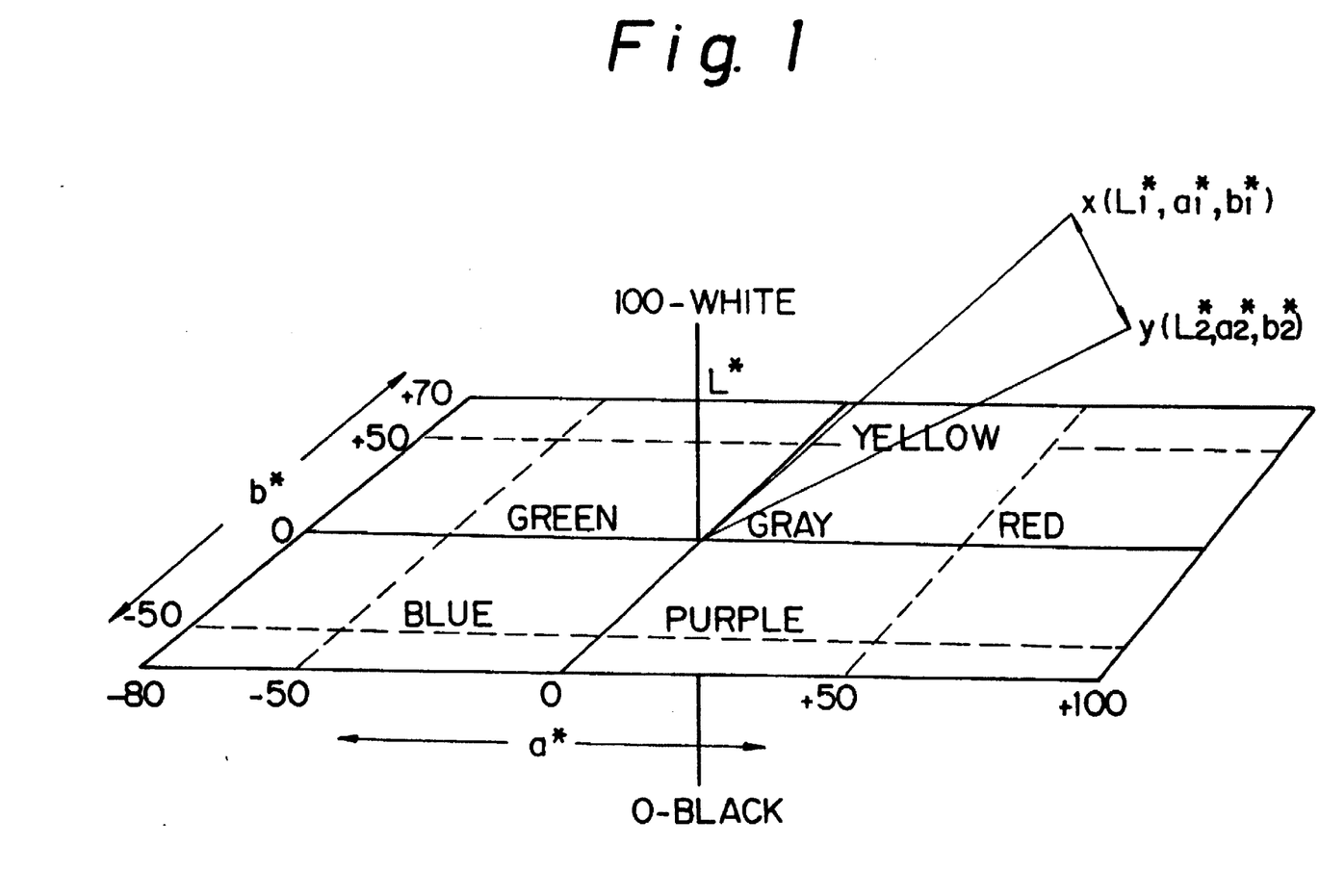
FIG. 1 to FIG. 4 are drawings used to explain the color space of CIE 1976 ($L^*$, $a^*$, $b^*$).

In the specification of the present invention, color is represented by CIE 1976 ($L^*$, $a^*$, $b^*$) color space. $L^*$, $a^*$, and $b^*$ represent three dimensional color, as shown in FIG. 1. $L^*$ represents the brightness of a color; the larger the value of $L^*$, the brighter the color the value of $L^*$ ranging from 0 to 100. a represents the red-green component of a color. The larger the value of $a^*$ in a plus direction, the more it signifies a red color; on the other hand, the larger the value of $a^*$ in a minus direction, the more it signifies a green color. Further, $b^*$ represents the yellow-blue component of a color. The larger the value of b* in a plus direction, the more it signifies tinging with a yellow color; on the other hand, the larger the value of b* in a minus direction, the more it signifies tinging with a blue color.

If two colors to be compared are x ($L^*_1$, $a^*_1$, $b^*_1$) and y ($L^*_2$, $a^*_2$, $b^*_2$) respectively, as shown in FIG. 1, then the color difference between x and y can be represented by the distance between these two points. Namely, the color difference $\Delta E$ between x and y can be represented as:

$$\Delta E^* = \sqrt{(L^*_2 - L^*_1)^2 + (a^*_2 - a^*_1)^2 + (b^*_2 - b^*_1)^2}$$

The larger $\Delta E^*$ is, the more the two colors are different. $\Delta E^*$ represents the extent of the color difference, but does not indicate how the colors are different.

Figure 2:
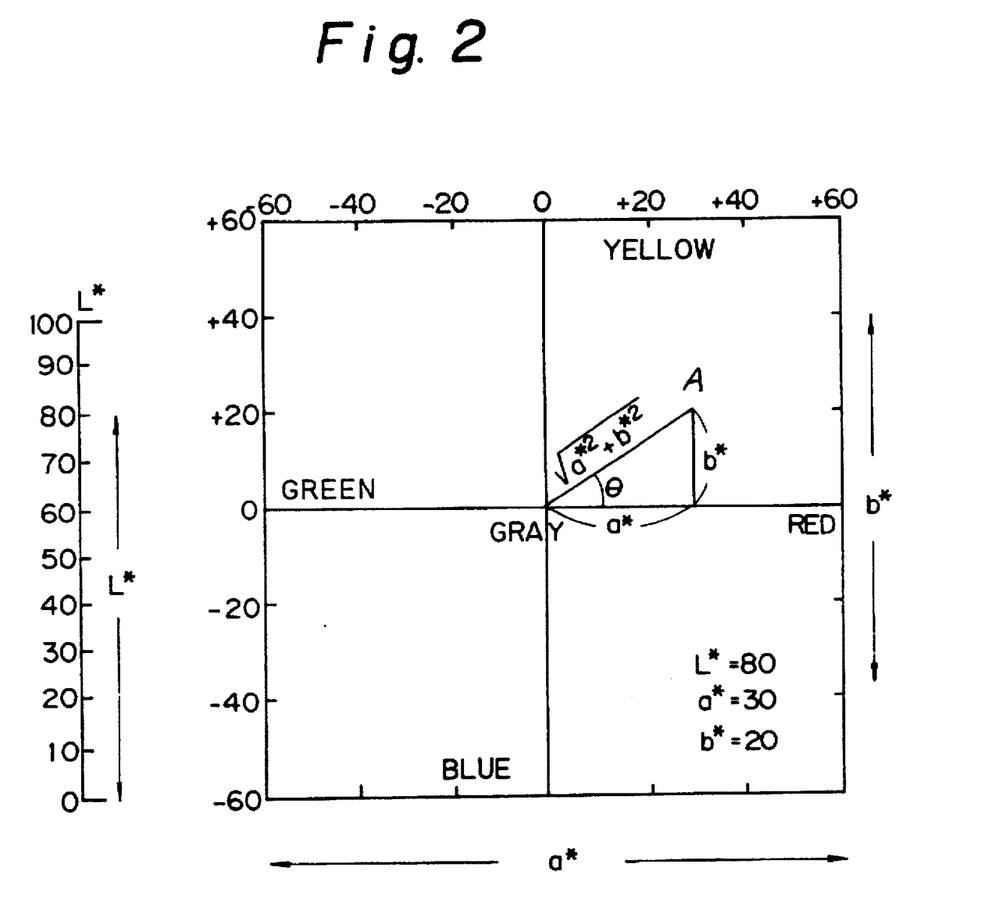

$C^*$ represents chroma, that is the extent of colorfulness of a color. The larger the value of $C^*$, the more the color possesses a high chroma. The chroma $C^*$ of point A shown in FIG. 2 is represented by the following formula.

$$C^* = \sqrt{a^{*2} + b^{*2}}$$

Figure 3:
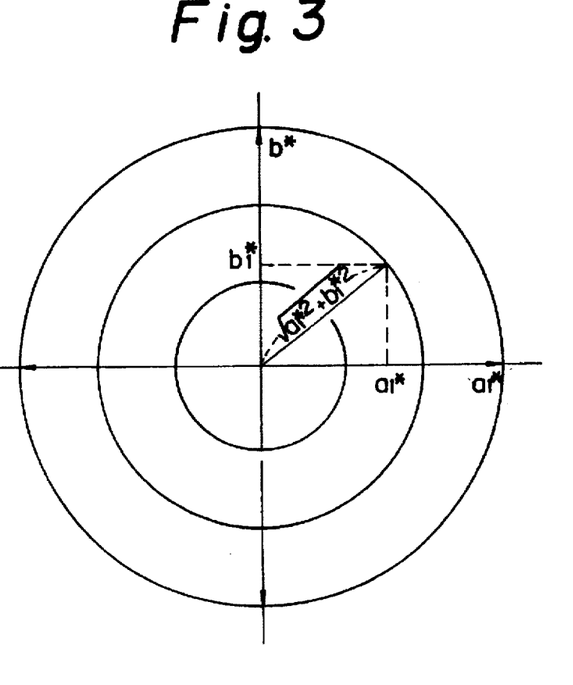

Further, if the value of $a^*$ and the value of $b^*$ are represented in co-ordinates as in FIG. 3, the colors on the circumference have the same chroma. Moreover, chroma increases as the color moves toward the outer circumference.

Finally, $H^*$ represents hue, and can be defined by the following formula.

$$H^* = \tan^{-1}(a^*/b^*)$$

Figure 4:
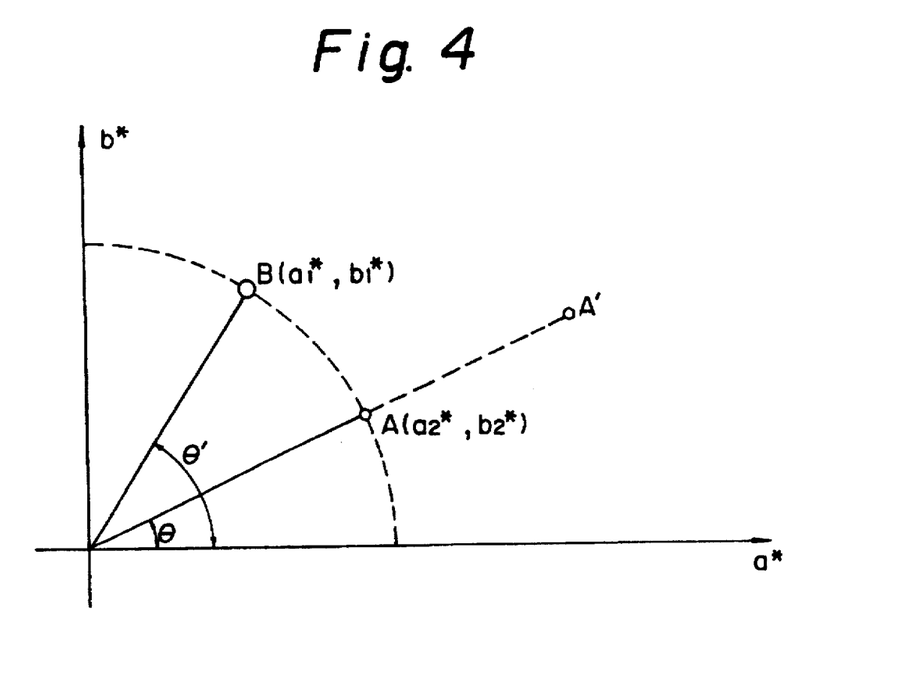

For example, in FIG. 4, when A' is compared with A, A' exhibits a high chroma, but their hues are the same. On the other hand, B shows the same chroma as A, but their hues are different.

The present invention will be described below in more detail in accordance with the Examples, however these Examples are mere illustrations and the present invention is by no means limited to them.

EXAMPLE 1

Commercially available yellow iron oxide ($\alpha$-FeOOH: Mapico YELLOW LL-XLO) was dispersed in an amount of 50 g into 500 ml of an aqueous solution of sodium aluminate containing 70 g/l $Al_2O_3$ and 120 g/l NaOH, and the mixture was charged to a nickel-lined autoclave with 1000 ml inner capacity. The contents of the autoclave were heated at a rate of 100° C./hr up to 250° C., and at a rate of 50° C./hr from 250° C.–280° C. The contents were then maintained at a maximum temperature of 280° C. under a maximum pressure of 65 kg/cm² for 30 minutes. After being allowed to cool, the contents were removed from the autoclave, washed with water until the electrical conductance of the filtrates decreased below 100 μs/cm, then dried in an electrical drier for 4 hours at a temperature of 120° C., thereby obtaining a mica-like red iron oxide containing aluminum in solid solution. The color tone of the resultant product was red, with an intense luster. Then the particle distribution was measured using Laser Micronsizer PRO-7000S made by SEISHIN ENTERPRISE, and the result was 4–32 μm, with the average diameter being 12 μm. The particles of 5–10 μm comprised 24.1 wt %, 10–15 μm comprised 25.9 wt % and 15–20 μm comprised 16.0 wt %, and the declination was 4.7.

By using a method of ultramicrotomy, it was possible to obtain a value of about 0.1 μm as a thickness of the crystal.

Further, X-ray diffraction for measurement of the lattice constant gave the results of $a_o$=5.025 Å, and $c_o$=13.72 Å, and chemical analysis gave the results of 2.88% $Al_2O_3$. After the said mica-like red iron oxide containing aluminum in solid solution was prepared in accordance with the following proportion (A), it was subjected to dispersion at 1800 rpm for 5 minutes using a dispermat, thus obtaining a color base paint.

| [Color base paint] | | (parts by weight) |
| --- | --- | --- |
| A | Lustrous pigment | 5.3 |
| | Acrylic varnish ACRYDIC 47-712 | 76.3 |
| | Melamine resin SUPER BEKKAMIN L-117 | 15.9 |
| | Soya lecithin | 1.7 |
| | DOP (dioctyl phthalate) | 0.8 |
| | | 100 |
| | | (PWC 10%) |
| B | Butyl cellosolve | 10.6 |
| | Toluene | 67.1 |
| | Butyl acetate | 22.3 |
| | | 100 |

Further, using the same method as in the color base paint, a clear paint having the following proportions was prepared.

| [Clear paint] | | (parts by weight) |
| --- | --- | --- |
| B | Acrylic varnish ACRYDIC 44-179 | 52.8 |
| | Melamine resin SUPER BEKKAMIN L-117 | 18.2 |
| | Xylene | 15.4 |
| | Butanol | 6.6 |
| | Butyl cellosolve | 7.0 |
| | | 100 |

Figure 5:
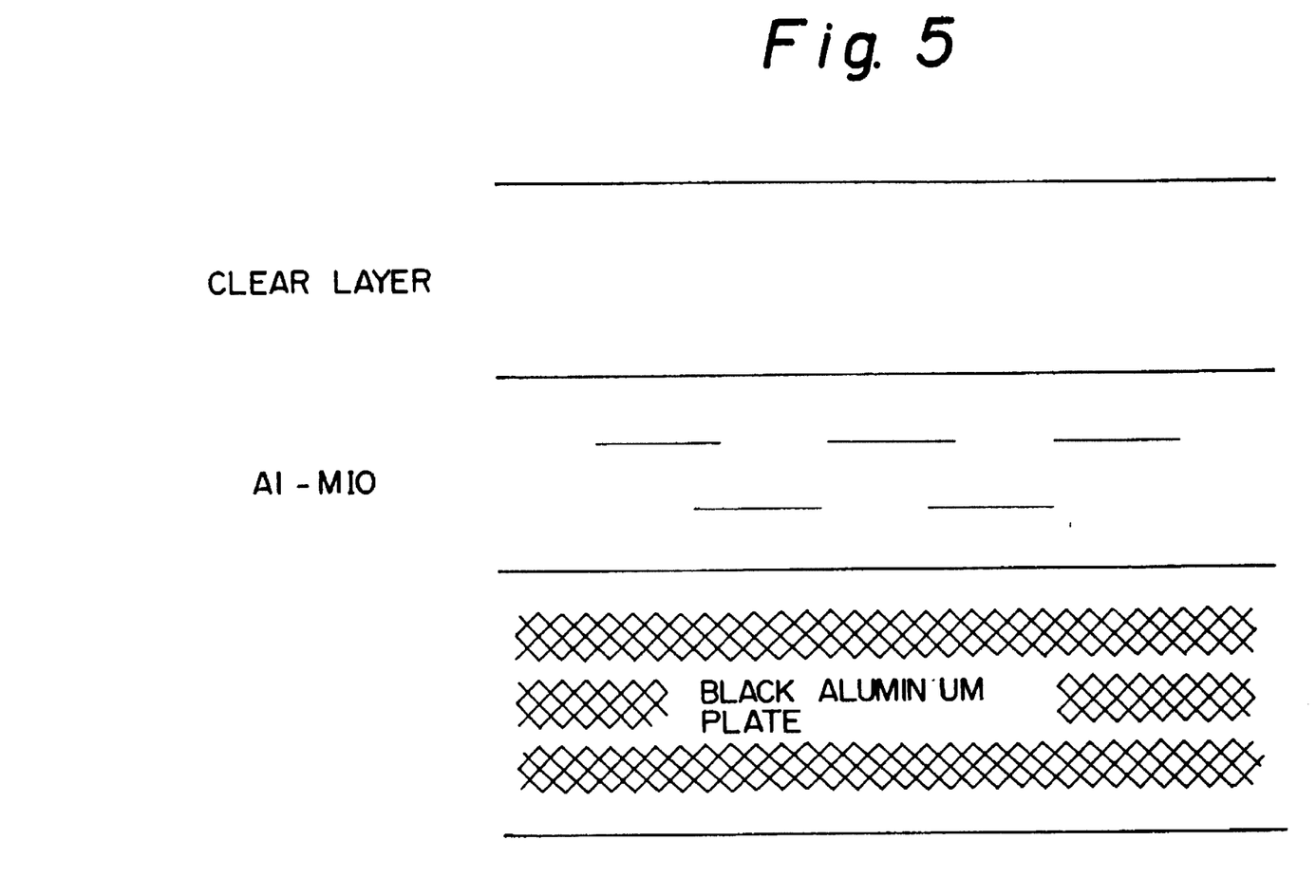
FIG. 5 and FIG. 9 are drawings showing the structure of the test plate in the Examples.

Among the above raw materials for paint, ACRYDIC 47-712 and ACRYDIC 44-179 are Acrylic varnish made by DAINIPPON INK AND CHEMICALS, INC. SUPER BEKKAMIN L-117 is a melamine resin also made by DAINIPPON INK AND CHEMICALS, INC. After the preparation of the aforesaid color base paint, the above composition (B) was added in order to obtain a paint viscosity of 15–17 sec in Ford cup No. 4. After adjusting the viscosity, the paint was applied by means of spray-painting to a black aluminum plate made by NIPPON TEST PANEL INDUSTRY K.K. until the dried coating layer attained a thickness of 20 μm, then after setting for two hours the above clear paint was applied by means of spray-painting until the dried coating layer attained a thickness of 30 μm. Namely, the spray-painting was continued until the total thickness, including the color base dried coating layer and the clear dried coating layer, reached 50 μm. After setting for 4 hours, the test material was subjected to backing treatment at a temperature of 150° C. for 30 minutes, thereby obtaining the test plate. A sectional view drawing of the test plate is shown in FIG. 5.

EXAMPLE 2

The powder of a yellow iron oxide ($\alpha$-FeOOH: Mapico YELLOW LL-XLO) was dispersed in an amount of 50 g into 500 ml of an aqueous solution of sodium aluminate containing 60 g/l $Al_2O_3$ and 95 g/l NaOH, and the same treatment as in Example 1 was carried out to obtain a mica-like red iron oxide containing aluminum in solid solution. Then the particle distribution of this resultant product was measured using Laser Micronsizer PRO-7000S made by SEISHIN ENTERPRISE and the particle diameter ranged from 1 to 64 µm. with the average diameter being 22 µm. Further, the thickness was about 0.1 µm. Then, X-ray diffraction for measurement of the lattice constant gave the results of $a_o$=5.020 Å, and $c_o$=13.70 Å, and chemical analysis gave the results of 4.41% $Al_2O_3$. Afterwards, the test plate was prepared by the same method as in Example 1.

EXAMPLE 3

A yellow iron oxide identical to that used in Example 1 was dispersed in an amount of 50 g into 500 ml of an aqueous solution of sodium aluminate containing 23 g/l $Al_2O_3$ and 40 g/l NaOH, then the mixture was charged to a nickel-lined autoclave with 1000 ml inner capacity. The contents of the autoclave were heated at a rate of 250° C./hr up to 300° C. The contents were then maintained at a maximum temperature of 300° C. under a maximum pressure of 87.6 kg/cm² for 30 minutes. The subsequent treatment was carried out in the same manner as in Example 1.

The particle diameter of the thus obtained mica-like red iron oxide containing aluminum in solid solution was in a range of 1-25 µm, with the average diameter being 6 µm. The thickness was about 0.06 µm. X-ray diffraction for measurement of the lattice constant gave the results of $a_o$=5.017 Å and $c_o$=13.69 Å, and chemical analysis gave the results of 5.32% $Al_2O_3$. Finally, the test plate was prepared by the same method as in Example 1.

COMPARATIVE EXAMPLE 1

Instead of using an aqueous solution of sodium aluminate, 240 g/l caustic soda aqueous solution was used as a mother liquid for hydrothermal treatment, and the same treatment as in Example 1 was carried out, thus obtaining plate-like particles of black-purple color as the resultant product. Particle distribution was measured using Laser Micronsizer PRO-7000S made by SEISHIN ENTERPRISE and the range of particle diameter was 1-48 µm, with the average diameter being 13 µm. Particles of 5-10 µm comprised 23.0 wt %, 10-15 µm comprised 28.0 wt % and 15-20 µm comprised 16.0 wt %, and the declination was 5.5. Further, the thickness was about 1 µm, and X-ray diffraction for measurement of the lattice constant gave the results of $a_o$=5.035 Å and $c_o$=13.75 Å.

As a Reference Example, a commercially available aluminum flake (ALUMIPASTE made by TOYO ALUMINUM K.K.) and a $TiO_2$-coated mica (IRIODIN 504 W) were used to prepare a test plate under the same conditions as in Example 1.

Figure 6:
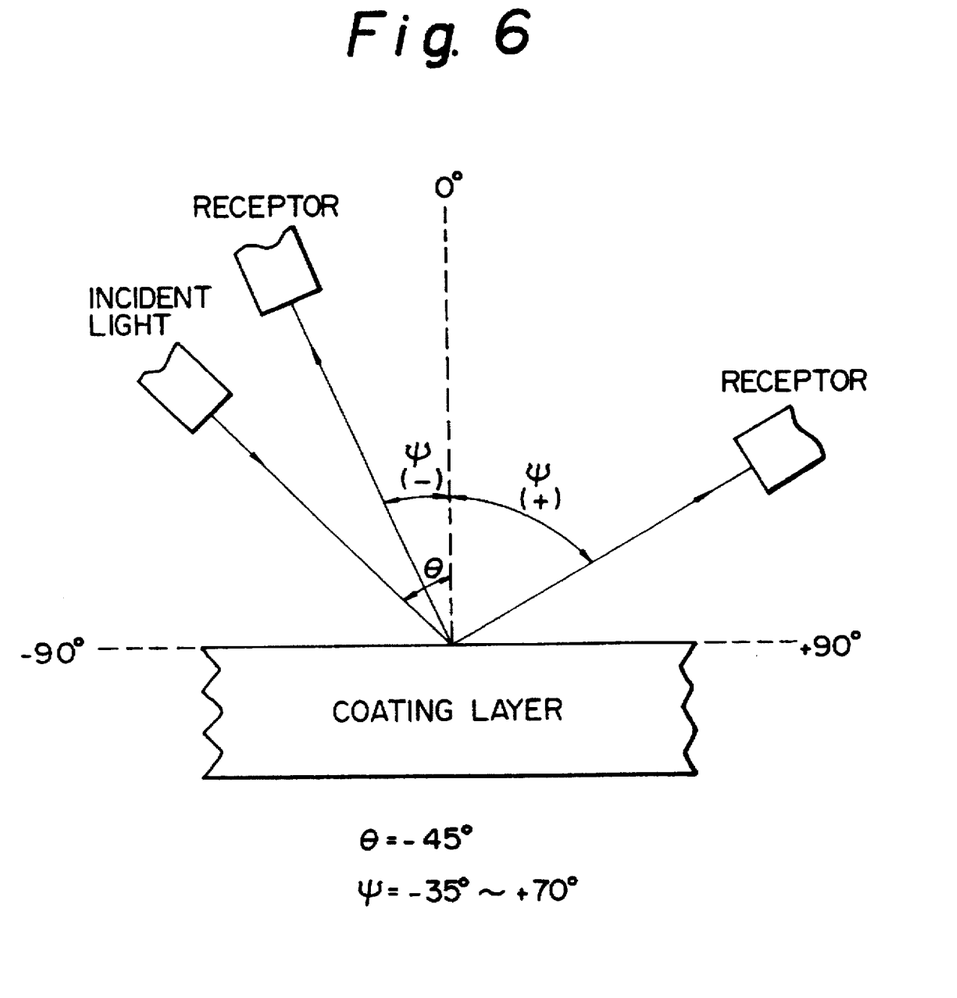
FIG. 6 is a model view showing color measurement by changing angle.
Figure 7A:
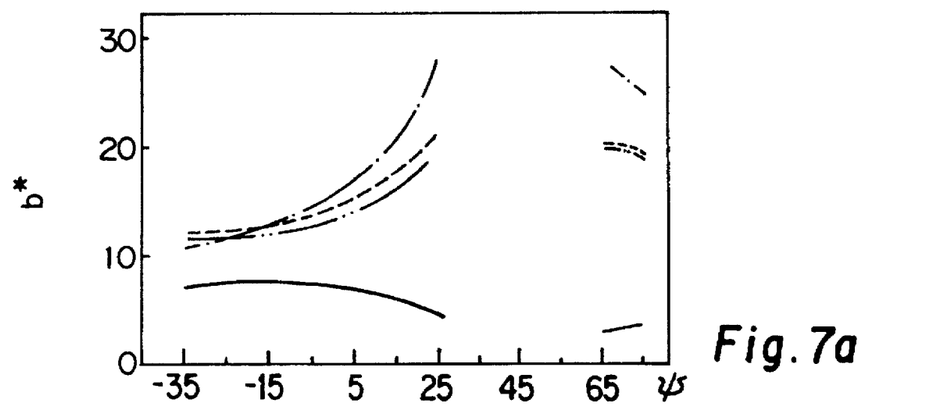
FIG. 7 and FIG. 8 are drawings showing results of the Examples.
Figure 7B:
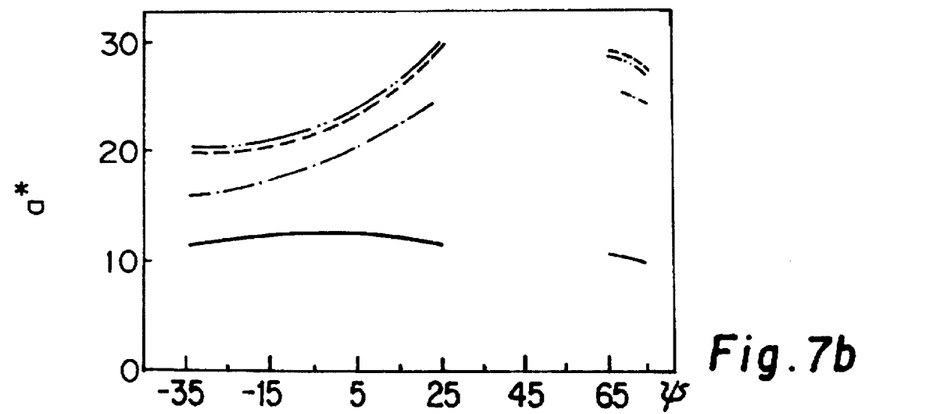
Figure 7C:
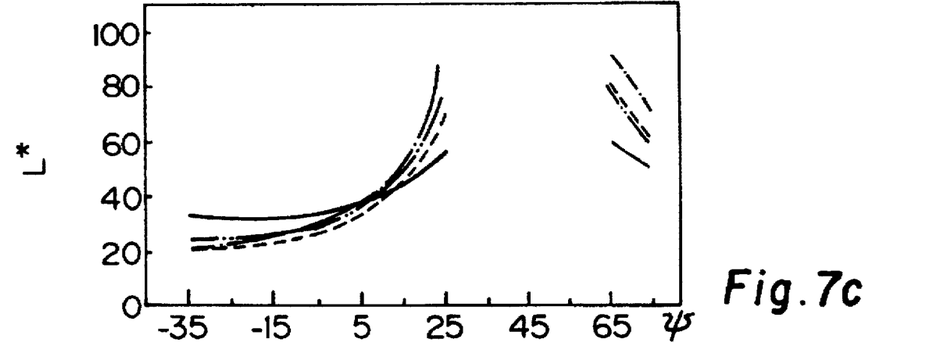

The color tones of the test plates obtained in Examples 1-3, the Comparative Example and the Reference S Example were measured using a three-dimensional spectro Multi-Angle colorimeter (GC-Σ 90 type) made by NIPPON DENSHOKU INDUSTRY K.K. Color differences depending on the observing angles were represented by numbers and the flip-flop properties thereof were evaluated. The said measurement was carried out by fixing the light radiating angle at 45° and changing the light receiving angle from −35° to 70° as shown in FIG. 6. The results of the measurement are shown in FIG. 7 and FIG. 8.

Figure 8A:
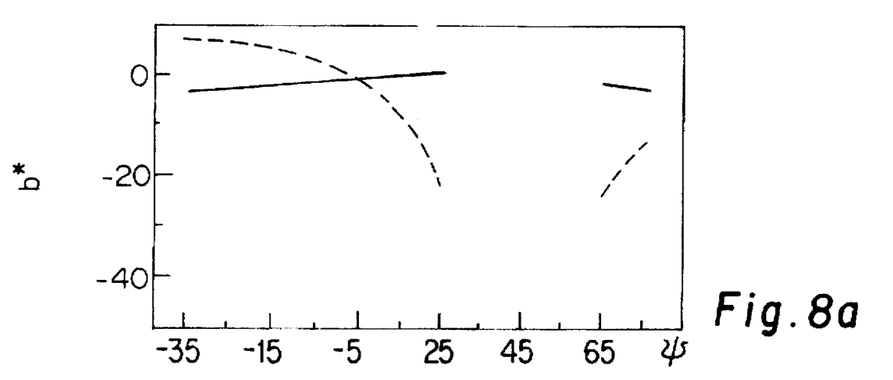
Figure 8B:
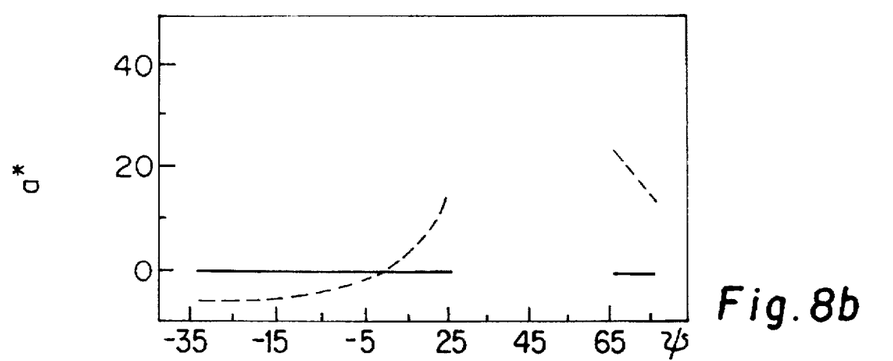
Figure 8C:
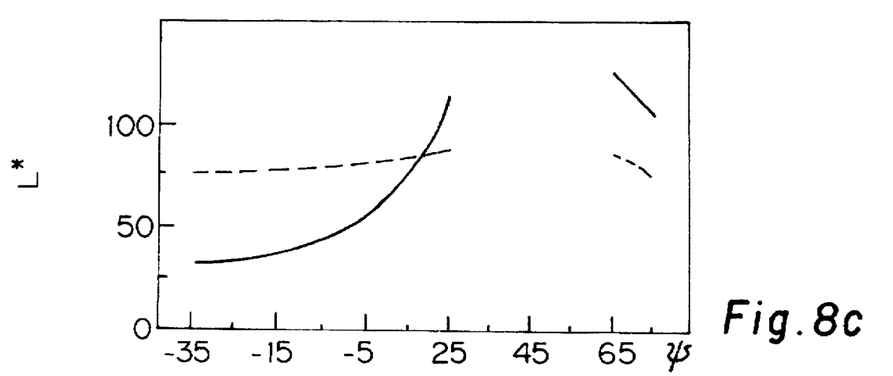

As shown in FIG. 8, in the case of aluminum flake, only the $L^*$ value, i.e. the brightness, varies depending on the observing angle. But in the case of the $TiO_2$-coated mica, although $a^*$ value and $b^*$ value, i.e. hue variation, can be found, the brightness undergoes almost no change. Further, in the case of the coating layer made by using Comparative Example 1 (MIO), although variation of the brightness due to the observing angle can be found, the hue undergoes almost no change. In contrast to the foregoing, in the case of coating layers made by using the materials of Example 1, Example 2 and Example 3, it was found that the $L^*$ value, $a^*$ value and $b^*$ value all vary greatly depending on the observing angles, i.e. not only the brightness but also the hue undergoes a change.

So far, the characteristic features of the coating layer have been described as above, but the layer containing this sort of iron oxide does not necessarily have to have a coating layer, for the film and sheet themselves exhibit the same effects. Moreover, it is not necessary for the under coat surface to be black or blackish.

The pigments obtained in Example 1 and Comparative Example 1 were used to carry out the following experiments by changing the under coat in the following manner.

The first layer:

On the aluminum panel made by NIPPON TEST PANEL INDUSTRY K.K., organic pigments of red, green and blue color were coated as a color base in such a way as to completely cover up the surface of the panel. The products used as organic pigments were respectively RUBICRON RED 400RG made by TOSO Company, HELIOGEN GREEN L8730 made by BASF Company and HELIOGEN BLUE L7080 made by BASF Company.

The second layer:

Various pigments obtained in the Examples and Comparative Examples were dispersed in the following proportion (I) using a dispermat at 1800 rpm for 5 minutes. Then composition (II) was added until the viscosity of the dispersed paint became 15-17 sec in Ford cup No. 4. The obtained paint was applied to the panel, already coated with the first layer, by means of air spray-painting in order to obtain a thickness of the dried coating layer within a range of 20-30 µm.

The third layer:

After coating the second layer, a setting treatment was carried out for several hours, then paint of proportion (III) was applied by means of air spray-painting in order to obtain 30-40 µm of thickness of dried coating layer, namely to obtain about 60 µm as a total thickness including the second and third layers.

| [Incorporation Proportion] | (parts by weight) |
|---|---|
| (1) Lustrous pigment | 2.6 |
| Acrylic varnish ACRYDIC 47-712 | 78.5 |
| Melamine resin SUPER BEKKAMIN L-117 | 16.4 |
| Soya lecithin | 1.8 |
| DOP (dioctyl phthalate) | 0.7 |
| | 100.0 |
| (2) Butyl cellosolve | 10.6 |
| Toluene | 67.1 |
| Butyl acetate | 22.3 |
| | 100.0 |
| (3) Acrylic varnish ACRYDIC 44-179 | 52.8 |
| Melamine resin SUPER BEKKAMIN L-117 | 18.2 |
| Xylene | 15.4 |
| Butanol | 6.6 |
| Butyl cellosolve | 7.0 |
| | 100.0 |

Figure 9:
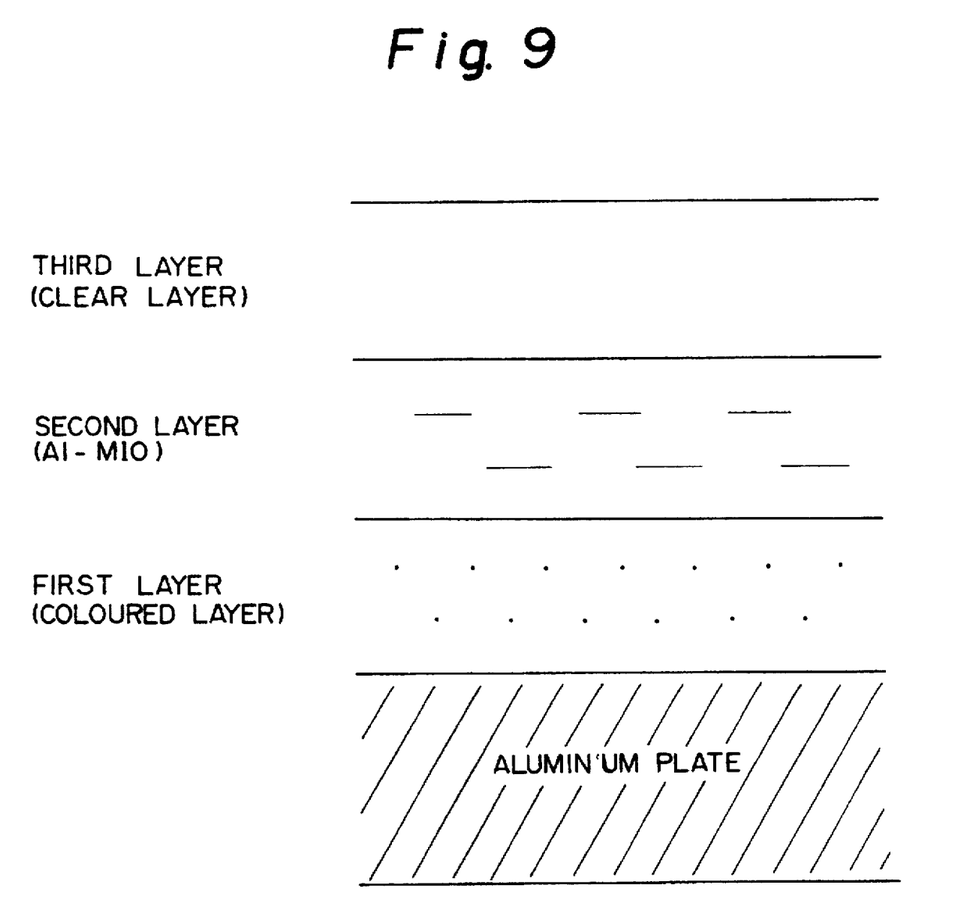

The structures of the coating layers thus obtained are shown in FIG. 9. The color tone of each test plate was measured using a three-dimensional spectro Multi-Angle colorimeter (GC-Σ 90 type) made by NIPPON DENSHOKU INDUSTRY K.K. The said measurement was carried out by fixing the light radiating angle at 45° and changing the light receiving angle from 0° to 30° The value measured by Multi-Angle colorimeter on each test plate is shown in Table 1. In Table 1, ΔE* represents the differences in color between viewing angles between 10° and 0°, 20° and 10°, and 30° and 20°. Similarly, ΔH* represents the differences in hue between 10° and 0°, 20° and 10°, and 30° and 20°. Hereinafter, the plate coated with a paint containing the iron oxide obtained in Example 1 is referred to as the Example plate, the plate coated with a paint containing the iron oxide obtained in Comparative Example 1 is referred to as the Comparative Example plate. Where the difference in color is represented by ΔE*, if ΔE* is 2, this will be a sufficient value for a lay observer to recognize comparative color differences. It can be understood from Table 1 that in the Example plate, the color of the first layer varies greatly depending on the viewing angles irrespective of whether the color is red, green or blue. Moreover, it can also be understood that where the color of the first layer is green or blue corresponding to a complementary relation with the red color of the second layer, the variation of the hue is also remarkable. For example, if a light receiving angle between 30° and 20° is observed, the color of 30° is completely different from the color of 20°. However, in contrast to the above, it is impossible to find the same unique phenomena in the Comparative Example plate. In spite of the great thickness of the plate-like particles of the iron oxide obtained in Comparative Example 1, although there is a little color variation, the test plate does not possess anything different from the commercially available prior art.

TABLE 1

The Values Measured by Multi-Angle Colorimeter on the Plates Prepared using the Samples of the Example and Comparative Example.

| | Color of the first layer (color base) | | | | | |
|---|---|---|---|---|---|---|
| | | Red | | Green | | Blue |
| Light receiving angle | | ΔE* | ΔH* | ΔE* | ΔH* | ΔE* | ΔH* |
| Example | 0–10° | 4 | 1 | 5 | 2 | 6 | 2 |
| | 10–20° | 8 | 2 | 11 | 4 | 14 | 5 |
| | 20–30° | 14 | 4 | 24 | 12 | 26 | 12 |
| Comp. | 0–10° | 2 | 0 | 4 | 1 | 4 | 1 |
| Example | 10–20° | 3 | 0 | 6 | 2 | 7 | 2 |
| | 20–30° | 4 | 0 | 7 | 2 | 8 | 2 |

$$\overline{X}\Delta E^* = \sqrt{(a^*_\theta - a^*_{(\theta-10)})^2 + (b^*_\theta - b^*_{(\theta-10)})^2 + (c^*_\theta - c^*_{(\theta-10)})^2}$$

$\Delta H^* = H^*_\theta - H^*_{(\theta-10°)}$
$H^* = \tan^{-1}(b^*/a^*)$
θ: light receiving angle The values measured by Multi Spectro Color Meter made by SUGA TEST INSTRUMENTS Co., Ltd. are shown in Table 2. It can be clearly seen from this Table that an appearance of high chroma, of the Example plate as compared with the Comparative Example plate, has been obtained, and this is one of the great effects obtained by the present invention.

The reasons why the chroma of the Example plate is much higher can be explained as follows. Namely, the mica-like red iron oxide containing aluminum in solid solution which was used in the Example is a high chroma pigment itself. Further, because of the thinness of the particles of the mica-like red iron oxide containing aluminum in solid solution, the amount of light passing through the plate-like particles, i.e., the transmitting amount of light, is large, and therefore the color of the under coat does not change.

TABLE 2

The Values Measured by Multi-Angle Colorimeter on the Plates Prepared using the Samples of the Example and Comparative Example.

| | L* | a* | b* | c* |
|---|---|---|---|---|
| The first layer (color base): red color | 37.0 | 50.6 | 18.5 | 53.9 |
| 1. The test plate prepared using the samples of the Example | 42.0 | 39.0 | 14.0 | 41.4 |
| 2. The test plate prepared using the samples of the Comparative Example 1–2 | 42.5 | 20.0 | 6.0 | 20.9 |
| | −0.5 | +19.0 | +8.0 | +20.5 |
| The first layer (color base): green color | 22.2 | −12.9 | −1.9 | 13.0 |
| 1. The test plate prepared using the samples of the Example | 38.0 | −17.6 | 7.1 | 19.0 |
| 2. The test plate prepared using the samples of the Comparative Example 1–2 | 40.4 | −10.0 | 3.0 | 10.4 |
| | −2.4 | −7.6 | +4.1 | +8.6 |
| The first layer (color base): blue color | 25.2 | 0.2 | −23.1 | 23.1 |
| 1. The test plate prepared using the samples of the Example | 32.0 | −10.0 | −16.5 | 19.3 |
| 2. The test plate prepared using the samples of the Comparative Example 1–2 | 33.5 | −3.0 | −11.3 | 11.7 |
| | −1.5 | −7.0 | −5.2 | +7.6 |

If it is required to make use of the features of flip-flop property, and further to obtain a product possessing a different and unique appearance, it will be permissible to add, for instance, super-micro particles of titanium oxide and transparent iron oxide to the second layer or the first layer. It is also permissible to incorporate organic pigments, inorganic pigments and other lustrous pigments in an appropriate amount.

What is claimed is:

1. A coating layer or a film formed on a substrate having remarkable flip flop properties consisting essentially of
   (a) thin flaky particles of red iron oxide containing aluminum in solid solution described by the formula α-$Fe_{2-x}Al_xO_3$ where 0<x<2 wherein the average thickness of said particles is less than 0.25 μm,
   (b) a pearl pigment,
   (c) an organic pigment having a color of blue, blue-green or green, and
   (d) a solid vehicle component
   wherein the ratio of the weight amount of said thin flaky particles to the weight amount of said solid vehicle component is in the range of from 0.1:100 to 20:100.
2. A multi-layered film formed on a substrate wherein said film consists essentially of
   (1) one or more resin-layers consisting of the film of claim 1, and
   (2) one or more transparent thermoplastic resin layers.

* * * * *